United States Patent
Jow et al.

(10) Patent No.: US 8,936,826 B2
(45) Date of Patent: *Jan. 20, 2015

(54) METHOD OF COATING STENTS

(75) Inventors: Kevin Jow, San Mateo, CA (US); Daniel A. Castro, Santa Clara, CA (US)

(73) Assignee: Abbott Cardiovascular Systems Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,087

(22) Filed: Aug. 22, 2011

(65) Prior Publication Data

US 2011/0305819 A1  Dec. 15, 2011

Related U.S. Application Data

(63) Continuation of application No. 11/864,236, filed on Sep. 28, 2007, now Pat. No. 8,003,158.

(51) Int. Cl.
*A61L 33/00* (2006.01)
*B05B 12/08* (2006.01)
*B23K 26/40* (2014.01)

(52) U.S. Cl.
CPC .......... *B05B 12/084* (2013.01); *B23K 26/4065* (2013.01)
USPC .......... 427/2.24; 623/1.46; 702/31; 427/2.25; 427/2.1; 427/346; 427/420; 427/425; 427/446; 427/447

(58) Field of Classification Search
USPC ............... 623/1.46, 1.42; 427/2.24, 2.1, 2.25, 427/346, 420, 421, 425, 446, 447
See application file for complete search history.

(56) References Cited

U.S. PATENT DOCUMENTS

| | | | |
|---|---|---|---|
| 5,091,647 A | 2/1992 | Carduner et al. | |
| 5,893,050 A | 4/1999 | Park et al. | |
| 6,818,247 B1 * | 11/2004 | Chen et al. | 427/2.24 |
| 8,003,158 B2 * | 8/2011 | Jow et al. | 427/2.24 |
| 2005/0070997 A1 * | 3/2005 | Thornton et al. | 623/1.46 |
| 2006/0038027 A1 | 2/2006 | O'Connor et al. | |
| 2007/0212394 A1 * | 9/2007 | Reyes et al. | 424/423 |
| 2007/0283552 A1 | 12/2007 | Gale et al. | |

FOREIGN PATENT DOCUMENTS

| | | |
|---|---|---|
| DE | 30 16 458 | 11/1981 |
| JP | 2004-216279 | 8/2004 |
| JP | 2005-503909 | 2/2005 |
| JP | 2006-500159 | 1/2006 |
| WO | WO 2006/048243 | 5/2006 |

OTHER PUBLICATIONS

U.S. Appl. No. 11/476,240, filed Jun. 27, 2006, Gale.
U.S. Appl. No. 11/764,003, filed Jun. 15, 2007, Van Sciver et al.

(Continued)

*Primary Examiner* — Dah-Wei D Yuan
*Assistant Examiner* — Andrew Bowman
(74) *Attorney, Agent, or Firm* — Squire Patton Boggs (US) LLP

(57) ABSTRACT

A method of coating a stent involves modifying a spray coating parameter until a target mass per coating layer is achieved. A method for coating involves spraying a batch of stents according to spraying parameters that were previously determined to provide a target mass per coating layer.

17 Claims, 10 Drawing Sheets

(56) References Cited

OTHER PUBLICATIONS

U.S. Appl. No. 11/764,006, filed Jun. 15, 2007, Chen et al.
U.S. Appl. No. 11/764,010, filed Jun. 15, 2007, Van Sciver.
International Search Report for PCT/US2008/076862, mailed Apr. 3, 2009, 8 pgs.
Translation of Japanese Notice of Reason for Rejection for appl. No. 2010-527040, dispatched Dec. 25, 2012, 3 pgs.

* cited by examiner

METHOD OF COATING STENTS

CROSS-REFERENCE TO RELATED APPLICATION

This application is a continuation of application Ser. No. 11/864,236, filed Sep. 28, 2007, which is incorporated herein by reference.

BACKGROUND OF THE INVENTION

1. Field of the Invention

This invention relates to methods for coating stents.

2. Description of the State of the Art

This invention relates to radially expandable endoprostheses that are adapted to be implanted in a bodily lumen. An "endoprosthesis" corresponds to an artificial device that is placed inside the body. A "lumen" refers to a cavity of a tubular organ such as a blood vessel. A stent is an example of such an endoprosthesis. Stents are generally cylindrically shaped devices that function to hold open and sometimes expand a segment of a blood vessel or other anatomical lumen such as urinary tracts and bile ducts. Stents are often used in the treatment of atherosclerotic stenosis in blood vessels. "Stenosis" refers to a narrowing or constriction of a bodily passage or orifice. In such treatments, stents reinforce body vessels and prevent restenosis following angioplasty in the vascular system. "Restenosis" refers to the reoccurrence of stenosis in a blood vessel or heart valve after it has been treated (as by balloon angioplasty, stenting, or valvuloplasty) with apparent success.

Stents are typically composed of scaffolding that includes a pattern or network of interconnecting structural elements or struts, formed from wires, tubes, or sheets of material rolled into a cylindrical shape. This scaffolding gets its name because it physically holds open and, if desired, expands the wall of the passageway. Typically, stents are capable of being compressed or crimped onto a catheter so that they can be delivered to and deployed at a treatment site. Delivery includes inserting the stent through small lumens using a catheter and transporting it to the treatment site. Deployment includes expanding the stent to a larger diameter once it is at the desired location. Mechanical intervention with stents has reduced the rate of restenosis as compared to balloon angioplasty. Yet, restenosis remains a significant problem. When restenosis does occur in the stented segment, its treatment can be challenging, as clinical options are more limited than for those lesions that were treated solely with a balloon.

Stents are used not only for mechanical intervention but also as vehicles for providing biological therapy. Biological therapy uses medicated stents to locally administer a therapeutic substance. Effective concentrations at the treated site require systemic drug administration that can produce adverse or even toxic side effects. Local delivery is a preferred treatment method because it administers smaller total medication levels than systemic methods, but concentrates the drug at a specific site. Local delivery thus produces fewer side effects and achieves better results.

A medicated stent may be fabricated by coating the surface of a stent with an active agent or an active agent and a polymeric carrier. Those of ordinary skill in the art fabricate coatings by applying a coating composition that includes a polymer, or a blend of polymers, to the stent using well-known techniques. Such a coating composition may include a polymer solution and an active agent dispersed in the solution. The composition may be applied to the stent by immersing the stent in the composition or by spraying the composition onto the stent. The solvent then evaporates, leaving on the stent surfaces a polymer coating impregnated with the drug or active agent.

Accurately loading drugs and minimizing coating defects are desired for improving coating quality. In addition, adequate throughput of the overall manufacturing process is also of concern.

SUMMARY OF THE INVENTION

Several embodiments of the present invention are directed to a method of coating stents with multiple layers of a coating material. In such embodiments, wherein each stent in a batch of coated stents can have the same total weight of coating materials and the same number of layers of coating materials. The stents can have roughly a uniform thickness of coating materials on the surface of the stents across the batch.

Certain embodiments are directed to a stent spraying device calibration procedure where a target mass per coating layer on a stent is selected, and the spraying machine parameter is adjusted to apply a coating layer at the target mass per coating layer. After spraying at least one layer of coating materials on a stent, the mass per coating layer is determined. If the target does not equal the actual mass per coating layer, then at least one spraying parameter is modified. At least one coating layer is again sprayed on the same stent, and the mass per coating layer is determined. When the target equals the actual mass per coating layer, then the process is complete.

In some embodiments, after performing the above calibration procedure, a batch of stents is sprayed, individually, using the calibrated spray coating machine, with a fixed number of layers of coating material. Each stent in the resulting batch of coated stents should have the same total weight of coating materials, the same number of layers of coating materials, and approximately the same thickness of coating material along the surface of the stent.

In aspects of the present invention, a method for coating a stent comprises a) spraying a coating material on a stent to form at least one coating layer on the stent, the spraying performed according to a plurality of spraying parameters, b) determining an actual mass per coating layer that is a result of the spraying, c) modifying at least one of the spraying parameters based on the determined actual mass per coating layer, and d) repeating steps a-c on the same stent or another stent until the determined actual mass per coating layer is within a tolerance range around a target mass per coating layer.

In aspects of the present invention, a method of coating a batch of stents comprises a) obtaining spraying parameters that will provide a target mass per coating layer on a stent when a coating material is sprayed on the stent, followed by b) spraying the coating material on a stent from the batch of stents, the spraying performed according to the obtained plurality of spraying parameters, c) drying the coating material that was sprayed on the stent to form a layer on the sent, d) repeating steps b and c until a desired total number of layers have been applied on the stent, and e) performing steps b-d for each additional stent in the batch of stents.

DETAILED DESCRIPTION OF THE INVENTION

Embodiments of the present invention relate to coating implantable medical devices such as stents. More generally, embodiments of the present invention may also be used in coating devices including, but not limited to, self-expandable stents, balloon-expandable stents, stent-grafts, vascular grafts, cerebrospinal fluid shunts, pacemaker leads, closure devices for patent foramen ovale, and synthetic heart valves.

Several embodiments of the present invention are related to a method of calibrating a stent coating device for a stent coating process where the coating is formed in multiple layers. In certain embodiments, the stent is coated with at least one layer of coating material and then weighed. The coating material per layer is determined and adjustments are made to the spraying parameters, if necessary, to achieve a target amount of coating material/layer.

Other embodiments of the invention are directed to a method of coating a stent. In some embodiments, the coating device is first calibrated using the calibration technique above such that a target amount of coating material/layer is applied. Next, a stent is coated with the number of layers necessary to achieve the total mass of coating desired on the stent.

Stent Structure

A stent can have virtually any structural pattern that is compatible with a bodily lumen in which it is implanted. Typically, a stent is composed of a pattern or network of circumferential and longitudinally extending interconnecting structural elements or struts. In general, the struts are arranged in patterns, which are designed to contact the lumen walls of a vessel and to maintain vascular patency. A myriad of strut patterns are known in the art for achieving particular design goals. A few of the more important design characteristics of stents are radial or hoop strength, expansion ratio or coverage area, and longitudinal flexibility. Embodiments of the present invention are applicable to virtually any stent design and are, therefore, not limited to any particular stent design or pattern. One embodiment of a stent pattern may include cylindrical rings composed of struts. The cylindrical rings may be connected by connecting struts.

In some embodiments, a stent may be formed from a tube by laser cutting the pattern of struts in the tube. The stent may also be formed by laser cutting a metallic or polymeric sheet, rolling the pattern into the shape of the cylindrical stent, and providing a longitudinal weld to form the stent. Other methods of forming stents are well known and include chemically etching a metallic or polymeric sheet and rolling and then welding it to form the stent.

In other embodiments, a metallic or polymeric filament or wire may also be coiled to form the stent. Filaments of polymer may be extruded or melt spun. These filaments can then be cut, formed into ring elements, welded closed, corrugated to form crowns, and then the crowns welded together by heat or solvent to form the stent.

Figure 1:
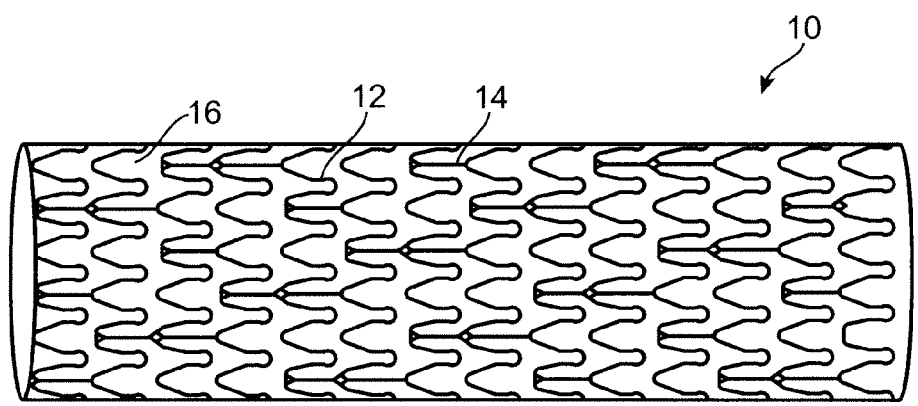
FIG. 1 depicts a three-dimensional view of a cylindrically-shaped stent.

FIG. 1 illustrates a conventional stent 10 formed from a plurality of struts 12. The plurality of struts 12 are radially expandable and interconnected by connecting elements 14 that are disposed between adjacent struts 12, leaving lateral openings or gaps 16 between adjacent struts 12. Struts 12 and connecting elements 14 define a tubular stent body having an outer, tissue-contacting surface and an inner surface.

The cross-section of the struts in stent 10 may be rectangular- or circular-shaped. The cross-section of struts is not limited to these, and therefore, other cross-sectional shapes are applicable with embodiments of the present invention. Furthermore, the pattern should not be limited to what has been illustrated as other stent patterns are easily applicable with embodiments of the present invention.

Coated Stent Structure

Figure 2A:
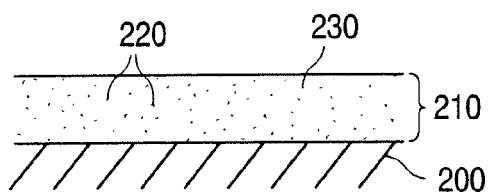
FIG. 2A depicts a cross-section of a stent surface with a drug-polymer layer.

A medicated stent may be fabricated by coating the surface of a stent with a drug. For example, a stent can have a coating including a drug dispersed in a polymeric carrier disposed over a substrate. FIG. 2A depicts a cross-section of a stent surface with a drug-polymer coating layer 210 over a substrate 200. In other embodiments, drug-polymer layer 210 can be disposed over a polymeric coating layer. In some embodiments, coating layer 210 can also be pure drug. Coating layer 210 includes a drug 220 dispersed in a coating polymer 230. As indicated above, a substrate or scaffolding can be metallic, polymeric, ceramic, or other suitable material.

Figure 2B:
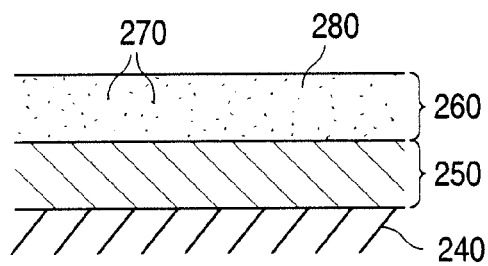
FIG. 2B depicts a cross-section of a stent surface with a primer layer and a drug-polymer layer.

FIG. 2B depicts a cross-section of a substrate 240 of a stent with a polymeric layer 250 disposed over substrate 240. A drug-polymer coating layer 260 is disposed over polymeric layer 250. Coating layer 260 includes a drug 270 dispersed within a polymer 280. Polymeric layer 250 can be a primer layer for improving the adhesion of drug-polymer layer 260 to substrate 240.

As indicated above, a coating layer may be formed by applying a coating material to a stent. The coating material can be a polymer solution and a drug dispersed in the solution. The coating material may be applied to the stent by immersing the stent in the coating material, by spraying the composition onto the stent, or by other methods known in the art. The solvent in the solution then evaporates, leaving on the stent surfaces a polymer coating impregnated with the drug. In other embodiments, the coating material can include a drug dispersed or dissolved in a solvent without a polymer.

A "solvent" for a given polymer can be defined as a substance capable of dissolving or dispersing the polymer or capable of at least partially dissolving or dispersing the polymer to form a uniformly dispersed mixture at the molecular- or ionic-size level. The solvent should be capable of dissolving at least 0.1 mg of the polymer in 1 ml of the solvent, and more narrowly 0.5 mg in 1 ml at ambient temperature and ambient pressure.

A substance incapable or substantially incapable of dissolving a polymer should be capable of dissolving only less than 0.1 mg of the polymer in 1 ml of the substance at ambient temperature and ambient pressure, and more narrowly only less than 0.05 mg in 1 ml at ambient temperature and ambient pressure. A substance incapable or substantially incapable of dissolving a given polymer is generally referred to as a non-solvent for that polymer.

Solvents and nonsolvents for polymers can be found in standard texts (e.g., see Fuchs, in Polymer Handbook, 3rd Edition and Deasy, Microencapsulation and Related Drug Processes, 1984, Marcel Dekker, Inc., New York).

General Apparatus for Coating a Stent

Spray coating a stent typically involves mounting or disposing a stent on a support, followed by spraying a coating material from a nozzle onto the mounted stent. A spray apparatus, such as EFD 780S spray device with VALVEMATE 7040 control system (manufactured by EFD Inc., East Providence, R.I., can be used to apply a coating material to a stent. An EFD 780S spray device is an air-assisted external mixing atomizer. The coating material is atomized into small droplets by air and uniformly applied to the stent surfaces. Other types of spray applicators, including air-assisted internal mixing atomizers and ultrasonic applicators, can also be used for the application of the coating material. To facilitate uniform and complete coverage of the stent during the application of the composition, the stent can be rotated about the stent's central longitudinal axis. The stent can also be moved in a linear direction along the same axis.

A nozzle can deposit coating material onto a stent in the form of fine droplets. The droplet size depends on factors such as viscosity of the solution, surface tension of the solvent, and atomization pressure. An atomization pressure of a sprayer can be maintained at a range of about 5 psi to about 30 psi. The flow rate of the composition from the spray nozzle can be from about 0.01 mg/second to about 1.0 mg/second, for example about 0.1 mg/second. Only a small percentage of the composition that is delivered from the spray nozzle is ultimately deposited on the stent. By way of example, when a composition is sprayed to deliver about 1 mg of solids, only about 100 micrograms or about 10% of the solids sprayed will likely be deposited on the stent.

Depositing a coating of a desired thickness in a single coating stage can result in an undesirably nonuniform surface structure and/or coating defects. Therefore, the coating process can involve multiple repetitions of spraying forming a plurality of layers. Each repetition can be about 0.5 seconds to about 20 seconds, for example about 10 seconds in duration. The amount of coating applied by each repetition can be about 1 microgram/cm$^2$ (of stent surface) to about 50 micrograms/cm$^2$, for example less than about 20 micrograms/cm$^2$ per 1-second spray. Typically, after the application of a coating material, the surface is allowed to dry or expressly dried. The drying can occur after a single pass of the stent by the spray nozzle, or after multiple passes by the spray nozzle. In one embodiment, two passes of coating material are sprayed onto the stent before the coating materials are dried.

Figure 3:
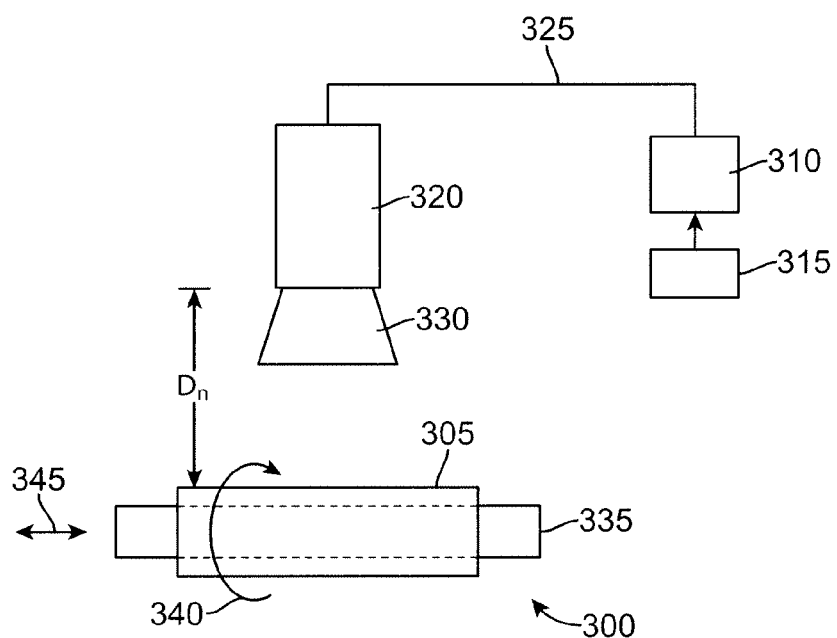
FIG. 3 depicts an exemplary schematic embodiment of a spray coating apparatus for coating a stent.

FIG. 3 depicts an exemplary schematic embodiment of a spray coating apparatus 300 for coating a stent 305. A syringe pump 310 pumps coating material from a reservoir 315 that is in fluid communication with a spray nozzle 320. Nozzle 320 can be in fluid communication with pump 310 through a hose 325. Nozzle 320 provides a plume 330 of fine droplets of coating material for depositing on stent 305. Nozzle 320 is positioned a distance Dn from the surface of stent 305. A flow rate of coating material provided by nozzle 320 can be varied by changing the pump rate of pump 310.

Stent 305 is supported by a stent support 335, such as a mandrel. Support 335 can be configured to rotate stent 305 about its cylindrical axis, as shown by an arrow 340. Support 335 can also be configured to axially or linearly translate stent 305 with respect to plume 330, as shown by an arrow 345. As an alternative, nozzle 320 can be linearly translated with respect to stent 305. Further, both nozzle 320 and stent 305 can be simultaneously or independently linearly translated with respect to each other.

Each linear translation of stent 305 past nozzle 320 and/or plume 330 may be referred to as a "pass." Stent 305 may pass nozzle/plume 320, 330 completely in one linear direction 345 to receive coating material, and then be directed in the reverse linear direction 345 past nozzle/plume 320, 330 to receive additional coating material.

A typical control scheme for a spraying process may include measuring the amount of coating in real time and making adjustments on the fly to various spraying parameters as the process continues. Because real time control schemes can be complex, it would be desirable to only have to calibrate the spraying device once at the beginning of a coating session.

Improved Spray Coating Method

Several embodiments of the present invention are directed to a method of coating stents with multiple layers of a coating material. Each stent in a batch of coated stents can have the same total weight of coating materials and the same number of layers of coating materials. The stents can have roughly a uniform thickness of coating materials on the surface of the stents across a batch of stents. The coating composition may include a polymer dissolved in a solvent. "Same total weight" of the coating materials means the total weight plus or minus a percentage of error. In certain embodiments, the error is about 5%, 10% or 15%. The margin of error may also be referred to as a "tolerance range." A "batch" of coated stents is a group of stents that are subjected to the same spraying process without adjusting the spray coating parameters. "Target mass per layer" is the desired mass of coating material applied in each layer to the surface of the stent. This target mass may be the mass of the coating layer before drying the layer, or after drying the layer. The target mass per layer may also be the mass per layer after baking (discussed below) a fully coated stent.

In some embodiments, "new" stent refers to a stent that has not been previously coated with the coating layer materials that are to be applied by the particular spraying procedure. In certain embodiments, a new stent may have a previously applied coating, such as a primer layer, or a previously applied drug-polymer layer. Typically, such previously applied layers will have been thoroughly dried prior to receiving a new coating layer. For the embodiments described below, a new stent is a stent with a known starting weight, and a surface that will accept a new coating layer.

In several embodiments, a coating layer may refer to a coating formed due to one pass of the stent past a spraying nozzle/plume, or more than one pass past the nozzle/plume as indicated above, followed by drying to remove solvent from the deposited coating material. For purposes of discussion, in the following embodiments, a layer comprises one pass of coating material that is allowed to dry, or is expressly dried, before a new pass of the stent past the spray nozzle is made. However, one of skill in the art will realize that each coating layer may be formed from several passes of the stent past the spray nozzle/plume, followed by a drying procedure.

Figure 4:
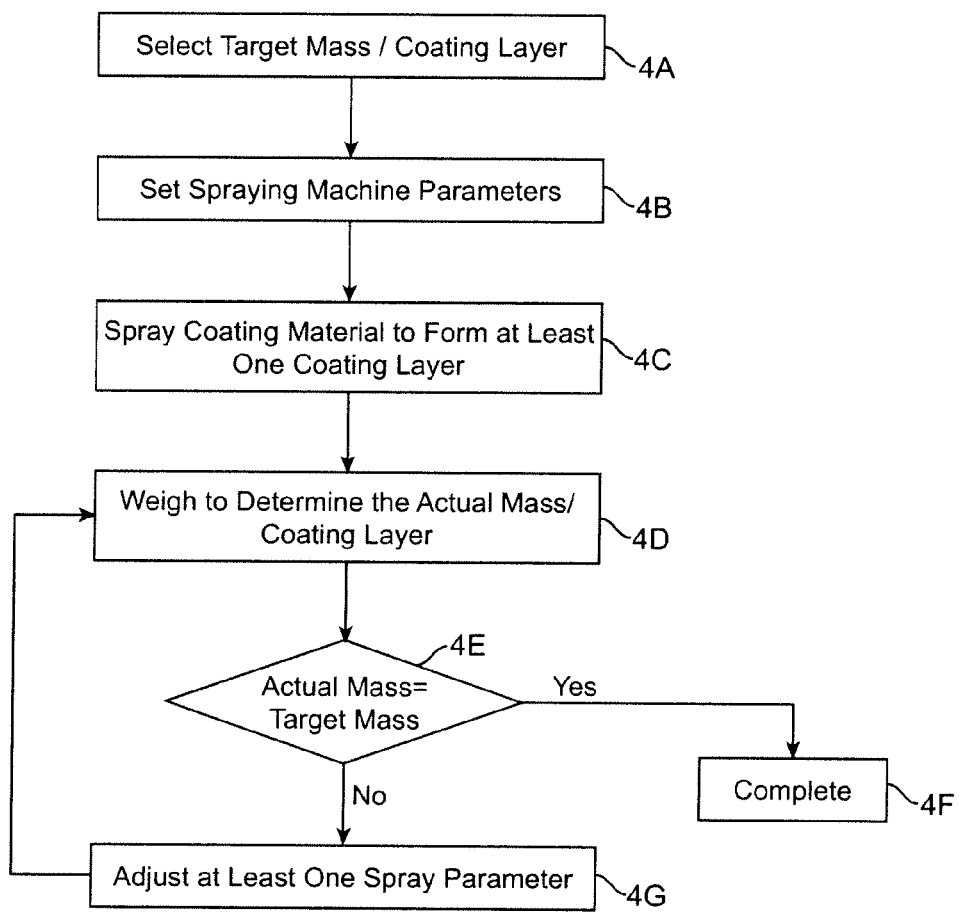
FIG. 4 depicts a method of calibrating a stent coating apparatus.

As illustrated in FIG. 4, certain embodiments are directed to a stent spraying device calibration procedure where a target mass per coating layer on a stent is selected 4A and then the spraying machine parameter(s) is/are adjusted 4B to what is/are believed to be the settings necessary to apply a coating layer at the target mass per coating layer. Spraying machine adjustable parameters will be discussed below. After spraying coating material to form at least one coating layer on a stent 4C, the mass per coating layer is determined 4D, which in some embodiments comprises weighing the coated stent. If the target does not equal the actual mass per coating layer 4E within a margin of error, then at least one spraying parameter is modified 4G. At least one coating layer is again formed on the same stent 4C, and the mass per coating layer is determined 4D. If the target equals the actual mass per coating layer, then the process is complete 4F.

Figure 5:
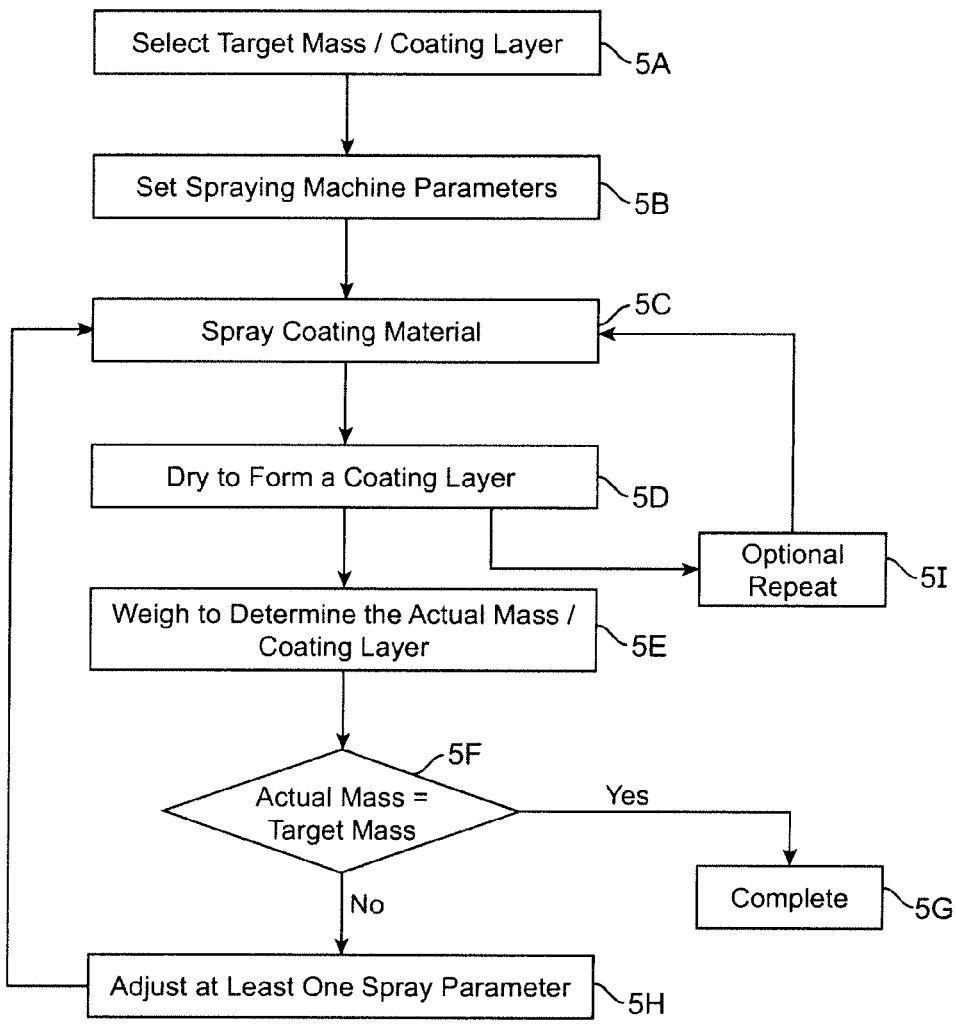
FIG. 5 depicts a method of calibrating a stent coating apparatus.

In several embodiments, the calibration process may include a drying procedure. As illustrated in FIG. 5, a target mass per coating layer on a stent is selected 5A, and then the spraying machine parameter(s) is/are adjusted 5B to what is/are believed to be the settings necessary to apply a coating layer at the target mass per coating layer. After spraying coating materials on a stent 5C, the coating materials are dried, thereby forming a coating layer 5D, and the mass per coating layer is determined 5E. Drying procedures will be described below. After weighing the stent 5E, if the target does not equal the actual mass per coating layer 5F, then at least one spraying parameter is modified 5H. Coating material is again sprayed on the same stent 5C, dried 5D, and the mass per coating layer is determined 5E. When the target equals the actual mass per coating layer, then the process is complete 5G. Drying process 5D may be repeated 5I after each application of coating materials is sprayed or may be performed after certain applications have been applied, such as every other application, or every other pass.

Figure 6:
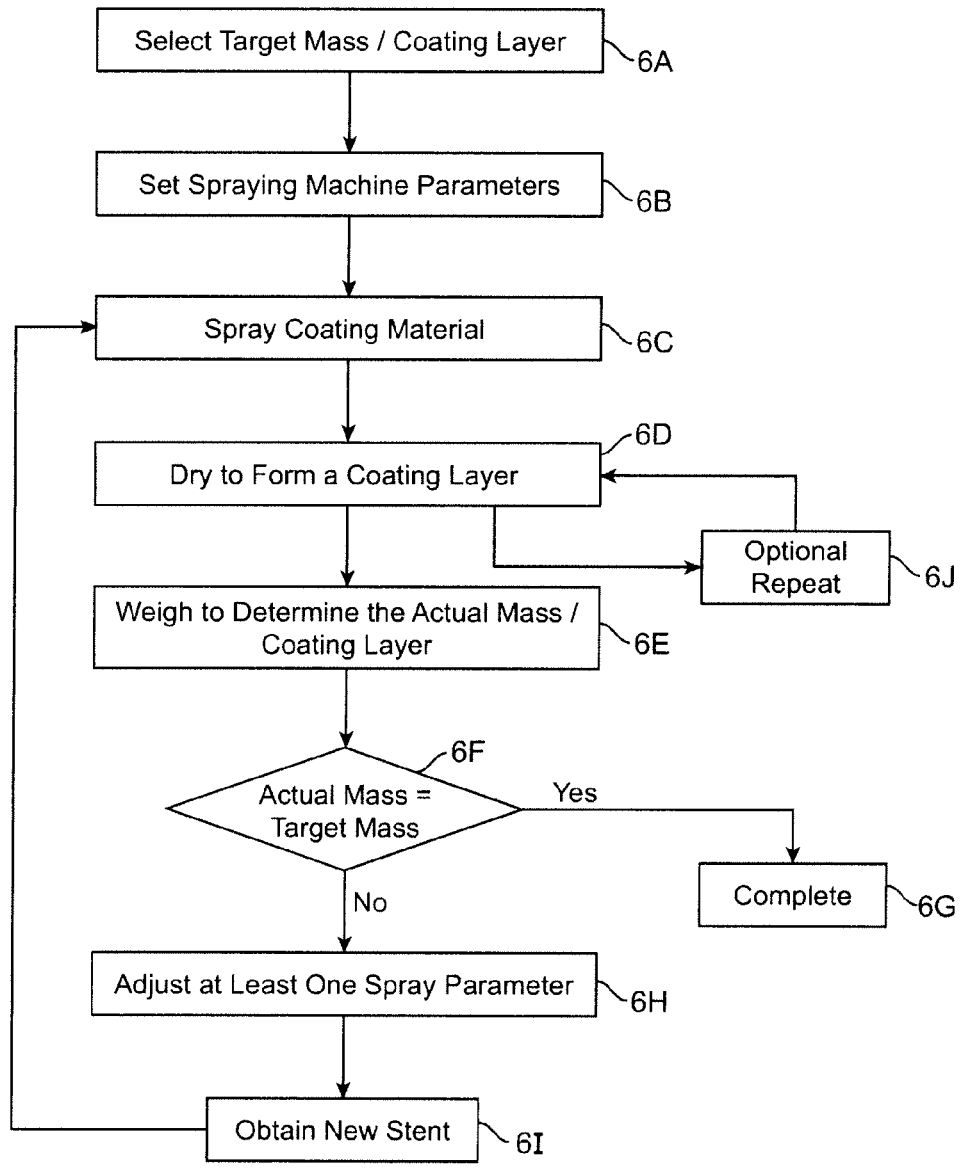
FIG. 6 depicts a method of calibrating a stent coating apparatus.

In some embodiments, a new stent may be used for each cycle of the calibration procedure until the targeted mass per coating layer equals the actual mass per coating layer. As illustrated in FIG. 6, a target mass per coating layer on a stent is selected 6A, and then the spraying machine parameter(s) is/are adjusted 6B to what is/are believed to be the settings necessary to apply a coating layer at the target mass per coating layer. After spraying at coating materials on a stent 6C, the coating materials are dried, thereby forming a coating layer 6D, optional additional applications of coating materials are applied and dried 6J, and the mass per coating layer is determined 6E. After weighing the stent 6E, if the target does not equal the actual mass per coating layer 6F, then at least one spraying parameter is modified 6H. A new stent 6I is obtained, coating materials are sprayed on 6C, the coating materials are dried 6D, thereby forming a coating layer, and the mass per coating layer is determined 6E. In some embodiments, instead of obtaining a new stent, the same coated stent is used. When the target mass has been achieved then the process is complete 6G. Drying process 6D may be repeated 6J after each application of coating materials is sprayed or may be performed after certain applications have been applied, such as every other application, or every other pass.

Figure 7:
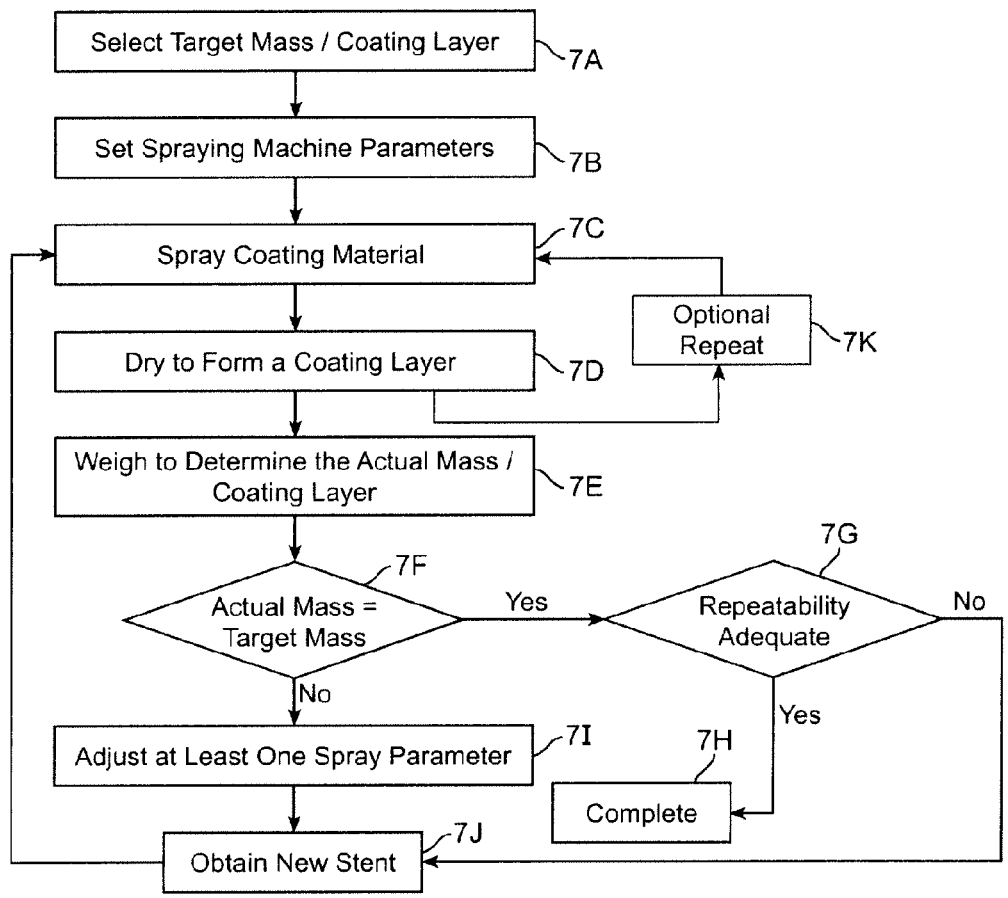
FIG. 7 depicts a method of calibrating a stent coating apparatus.

In certain embodiments, the calibration procedure is performed until the targeted mass per coating layer equals the actual mass per coating layer on more than one consecutive stent. As illustrated in FIG. 7, a target mass per coating layer on a stent is selected 7A, and then the spraying machine parameter(s) is/are adjusted 7B to what is/are believed to be the settings necessary to apply a coating layer at the target mass per coating layer. After spraying coating materials on a stent 7C, the coating materials are dried 7D, thereby forming a coating layer, optional additional coating materials are applied and dried 7K, and the mass per coating layer is determined 7E. After weighing the stent 7E, if the target does not equal the actual mass per coating layer 7F, then at least one spraying parameter is modified 7I. A new stent 7J is obtained, coating materials are sprayed on 7C, the coating materials are dried 7D, thereby forming a coating layer, and the mass per coating layer is determined 7E. In some embodiments, instead of obtaining a new stent, the same coated stent is used. If the target equals the actual mass per layer 7F, then a determination is made if the repeatability (i.e., consistency) is acceptable 7G. If no, then a new stent is obtained 7J and the process is repeated back to the spraying procedure 7C. In some embodiments, acceptable repeatability is at least one, or more than one consecutive stent having the target mass per coating layer equal the actual mass per coating layer. In certain embodiments, the repeatability is acceptable if three consecutive stents have the target equal the actual mass per coating layer. After repeatable results have been established, the process is complete 7H. Drying process 7D may be repeated 7K after each application of coating materials is sprayed or may be performed after certain applications have been applied, such as every other application, or every other pass.

Figure 8:
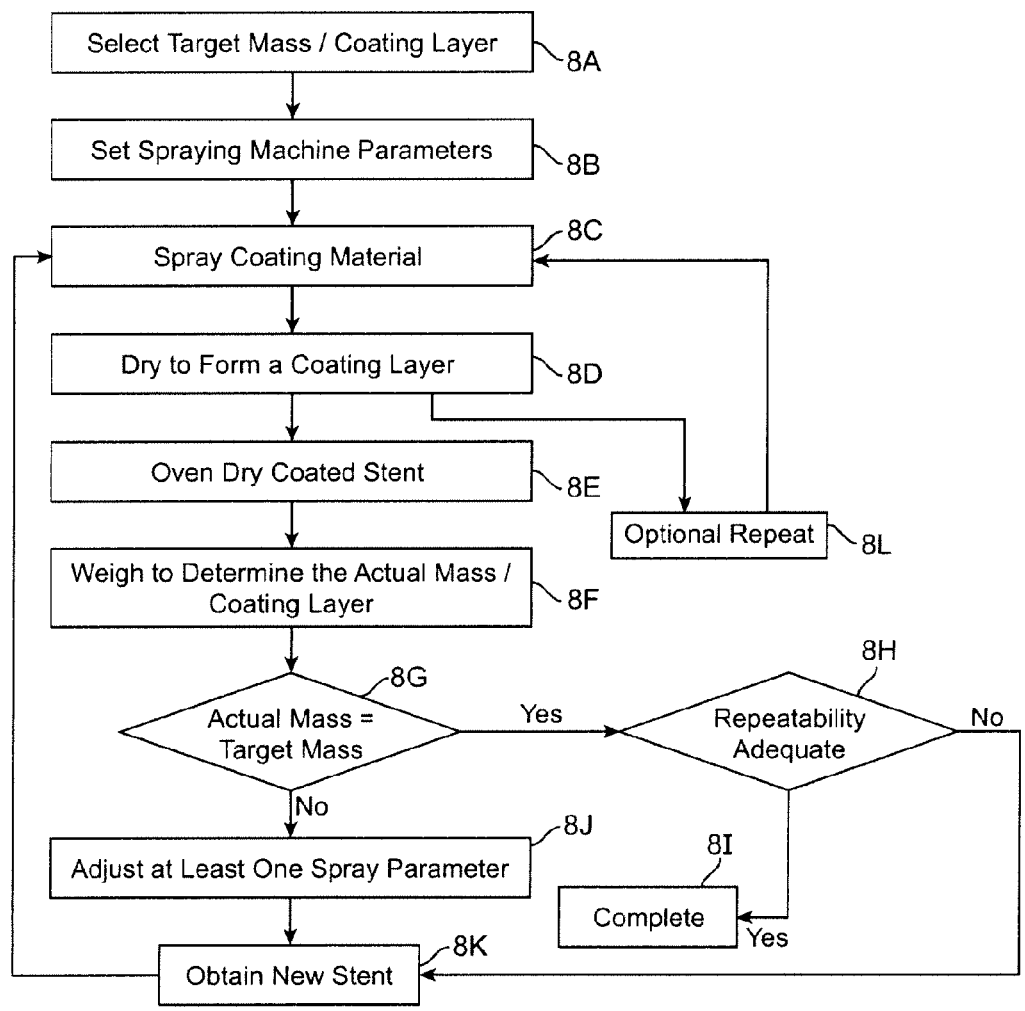
FIG. 8 depicts a method of calibrating a stent coating apparatus.

In some embodiments, the calibration procedure includes a baking procedure prior to weighing the coated stents. As illustrated in FIG. 8, a target mass per coating layer on a stent is selected 8A, and then the spraying machine parameter(s) is/are adjusted 8B to what is/are believed to be the settings necessary to apply a coating layer at the target mass per coating layer. After spraying coating materials on a stent 8C, the coating materials are dried 8D, thereby forming a coating layer, optional additional coating materials are applied and dried 8L, and the fully coated stent is oven dried 8E. The oven drying process will be described below. After weighing the stent 8F and determining the mass per coating layer, if the target does not equal the actual mass per coating layer 8G, then at least one spraying parameter is modified 8J. A new stent 8K is obtained, coating materials are sprayed on 8C, the coating materials are dried 8D thereby forming a coating layer, optionally repeated 8L, baked, 8E, followed by determining the mass per coating layer 8G. In some embodiments, instead of obtaining a new stent, the same coated stent is used. If the target equals the actual mass per layer 8G, then a determination is made if the repeatability is acceptable 8H. If no, then a new stent is obtained 8K and the process is repeated back to the spraying procedure 8C. After repeatable results have been established, the process is complete 8I. Drying process 8D may be repeated 8L after each application of coating materials is sprayed or may be performed after certain applications have been applied, such as every other application, or every other pass.

Figure 9:
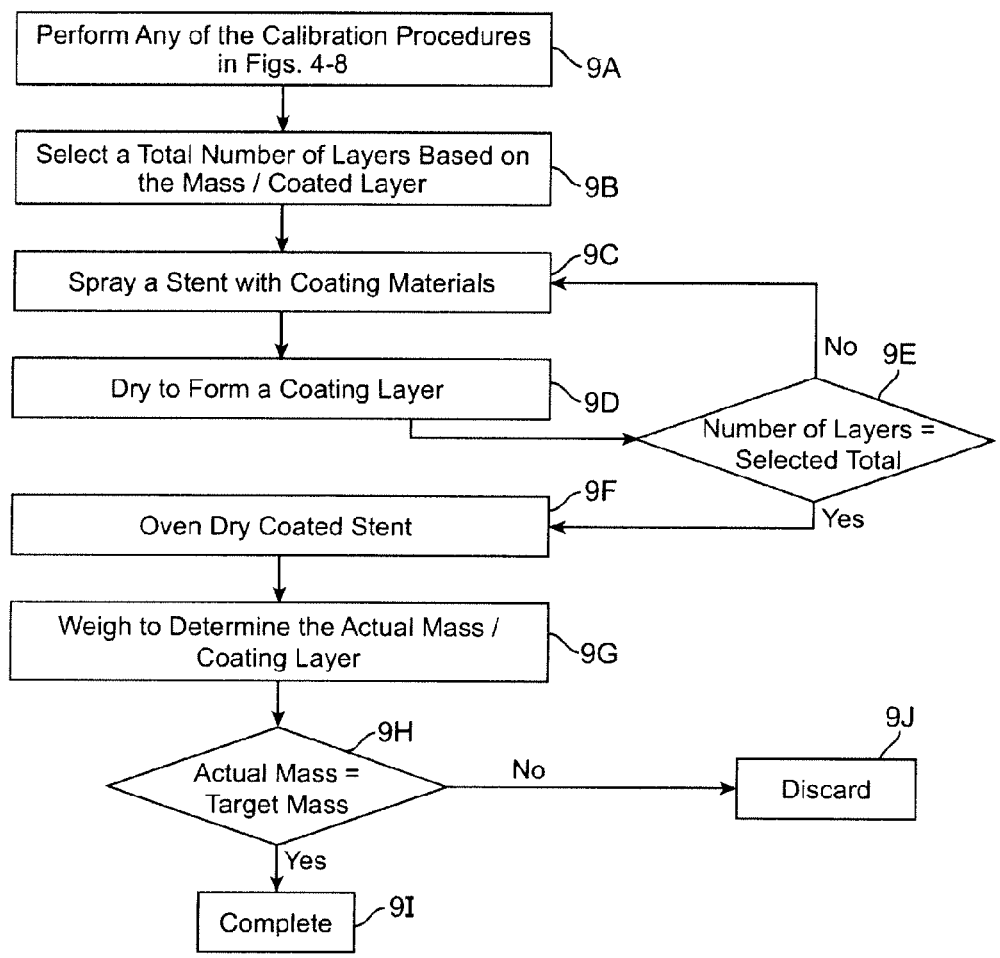
FIG. 9 depicts a method of coating a batch of stents.

Several embodiments of the invention are related to the coating of a batch of stents. As illustrated in FIG. 9, first a calibration procedure 9A is performed on a stent spray coating machine as disclosed in FIGS. 4-8. After a total number of layers of coating material based on the mass per coating layer is selected 9B, then the stent is sprayed 9C, and dried 9D to form a coating layer. If the selected number of layers has not been sprayed 9E, then the spraying 9C and drying 9D steps are repeated until all of the desired coating layers have been applied 9E. Next, the fully coated stent is oven dried 9F and then weighed 9G. When the total coating weight of the coated stent is within specifications 9H, then the process is complete 9I. If the specifications have not been met 9H, then the stent may be discarded 9J. The process, 9C to 9J, is repeated on each stent in the batch of stents to be coated. Each coated stent of the resulting batch of coated stents may have the same weight of coating materials, the same number of layers of coating materials, and approximately the same thickness of coating materials uniformly applied along the surface of the stent.

Figure 10:
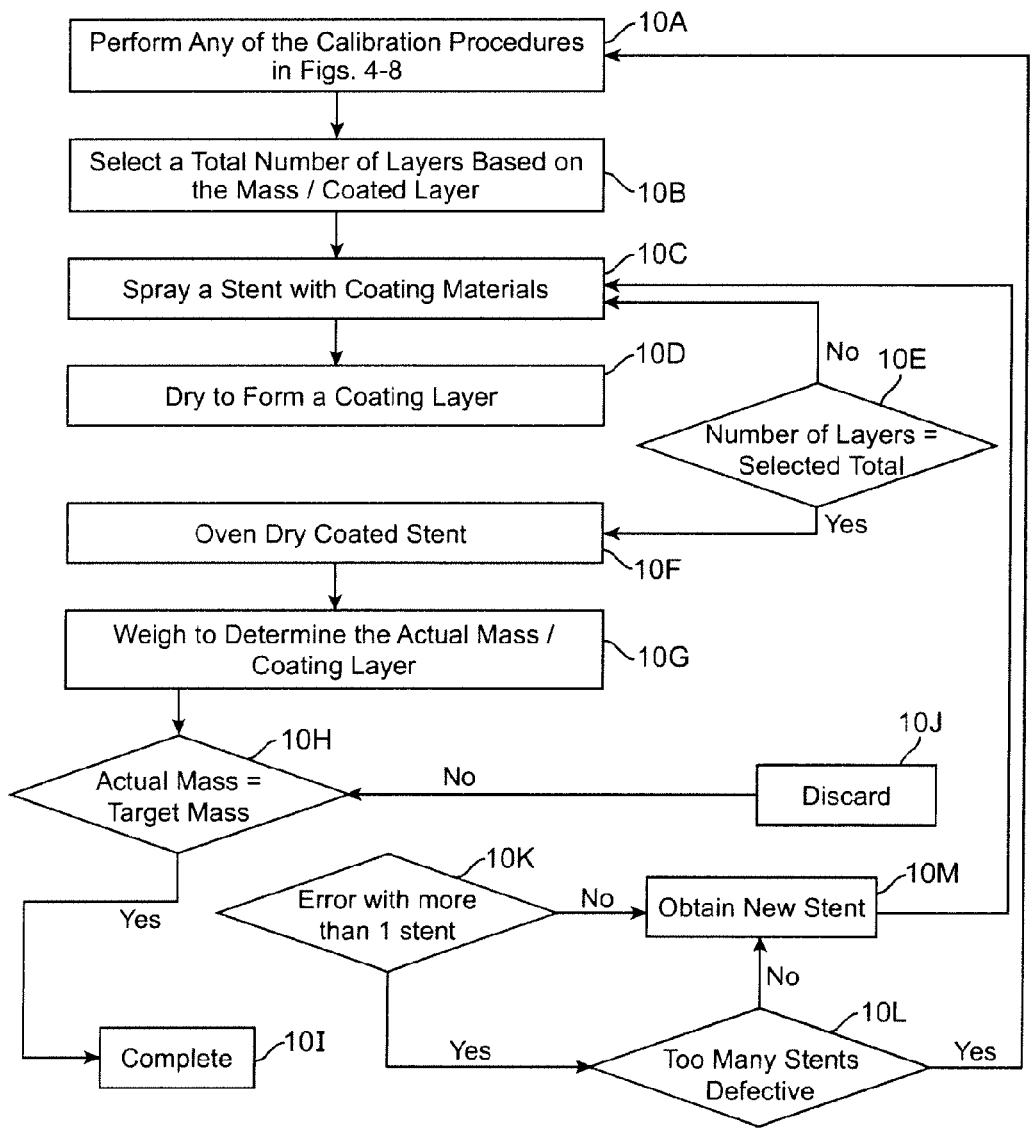
FIG. 10 depicts a method of coating a batch of stents.

Certain embodiments of the invention are related to the consistency of the coating process when coating a batch of stents. As illustrated in FIG. 10, first a calibration procedure 10A is performed on a stent spray coating machine as disclosed in FIGS. 4-8. After a total number of layers of coating material based on the mass per coating layer is selected 10B, then the stent is sprayed 10C, and dried 10D to form a coating layer. If the selected number of layers has not been sprayed 10E, then the spraying 10C and drying 10D steps are repeated until all of the desired coating layers have been applied 10E. Next, the fully coated stent is oven dried 10F and then weighed 10G. If the total coating weight of the coated stent is within specifications 10H, then the process is complete 10I. If the specifications have not been met 10H, then the stent may be discarded 10J. If only one stent within the batch has been defective, then obtain a new stent 10M and repeat the process, 10C to 10M. If more than one stent in a batch has been defective 10K, then determine if too many consecutive or closely sequential coated stents have been defective in the batch 10L, i.e., the number of defective stents is too high. In some embodiments, too many defective stents is more than one defective stent. If the number of defects is too high, then the spraying machine should be recalibrated 10A, followed by the rest of the process through 10M. In certain embodiments, block 10K is eliminated and thus after every defective stent is obtained, an evaluation of whether to recalibrate the spray machine 10L is made. If there are no concerns with the errors 10L, then a new stent is obtained 10M and the process, 10C to 10M, is repeated on each stent in the batch of stents to be coated. Each coated stent of the resulting batch of coated stents should have the same weight of coating materials within tolerances, the same number of layers of coating materials, and approximately the same thickness of coating materials within tolerances uniformly applied along the surface of the stent.

In the embodiments described above, one of skill in the art will realize that the drying step after the application of each layer of coating material is optional, or may be performed only after the application of certain layers, such as every other layer. One advantage of this technique may be that each additional layer is applied to a prior layer that may have similar adhesion characteristics to the other prior layers. A disadvantage of this technique may be that additional time is required between layers to allow for the prior layer to dry.

As indicated above, the coating composition may include a polymer dissolved in a solvent. Each application of a layer can be followed by removal of a portion of the solvent(s) in a drying step. In an embodiment, there may be less than 5%, 3%, or more narrowly, less than 1% of solvent remaining in the coating after drying between repetitions. In certain embodiments, the solvents are removed only after certain coating layers are applied, such as after every other coating layer. When the coating process is completed, all or substantially all of the solvent may be removed from the coating material on the stent, typically referred to as "oven drying" the stent. The stent may be oven dried until a constant weight is obtained.

The mass per coating layer is determined by weighing the stent either before or after the oven drying process. Typically, the weight of an uncoated stent is compared to the weight of itself after the coated has been applied to determine the amount of coating that has been applied. In the alternative, a stent may be weighed before the coating process, again throughout the process, or again after the coating process has been completed. The amount of coating is calculated as the difference between beginning and final weights.

In some embodiments, a fixed total coating layer mass is the starting desired quantity. The coating thickness of the fully coated stent may be calculated by dividing the total mass desired by the density of the coating materials and also dividing by the surface area of the stent. The number of layers necessary may be calculated based on spray machine parameters, such as the flow rate of the coating materials from the nozzle, resulting in a targeted mass per coating layer. The embodiments described above utilizing a targeted mass per coating layer may then be followed.

In certain embodiments, a fixed number of layers and a total coating weight are the starting desired quantities. A spraying parameter, such as the mass of coating material deposited per surface area of the stent by each pass of the nozzle, may be varied. This will fix the targeted mass per coating layer, allowing the embodiments described above to be utilized in calibrating a stent spray machine, and/or spraying a batch of stents.

Spray Coating Parameters

A further aspect of the present invention relates to manipulation of spray coating parameters to obtain desired processing goals and coating characteristics. Spray coating parameters that may be manipulated, either directly or indirectly, can include, but are not limited to, flow rate of coating material, axial translation speed of stent, rotation speed, nozzle height, spray atomization gas temperature, spray atomization gas flow rate (controlled by pressure), the size of the atomized droplets, the temperature of the atomized coating material between the nozzle and the stent, and the flow rate of the atomized coating between the nozzle and the stent. Each may influence the mass per coating layer, typically by affecting the solvent evaporation characteristics. An example of indirectly manipulating a parameter would be that of the size of the atomized droplets. The atomized droplet size may be influenced by the material flow rate, the atomized gas flow rate, and/or the atomized gas temperature. Thus, an adjustment to the material flow rate, the atomized gas flow rate, and/or the atomized gas temperature may lead to a change in the atomized droplet size.

With respect to temperature, increasing the spray gas atomization temperature and temperature of the atomized coating material between the nozzle and the stent tends to decrease the fraction of solvent in the coating material. Increasing the temperature will cause evaporation of solvent from the coating material resulting in a decrease in the fraction of solvent in the coating material. A nozzle can be equipped with a heating element to heat the coating material before and/or during atomization above an ambient temperature. In addition, the atomized coating material and the coating material applied to the stent can be heated. For example, heat nozzles can blow a heated gas on the coating material between the nozzle and the stent and on the stent. Both the temperature and flow rate of heated gas can also affect the evaporation of solvent from the coating material, which ultimately may affect the targeted mass/layer on a stent due to different amounts of coating materials being dissolved/suspended in the solvents at different temperatures or pressures.

Additionally, increasing the spray gas atomization flow rate (atomization pressure) can also decrease the fraction of solvent in the coating material. Also, the spray coating apparatus can be enclosed in a chamber to allow control of the pressure of atomized coating material. Reducing the chamber pressure, for example, to below ambient pressure will reduce the fraction of solvent in the atomized coating material.

Additional parameters that can be used to directly or indirectly control the fraction of solvent in applied coating material include the flow rate of the coating material, distance Dn, and the size of droplets of atomized droplets. Increasing distance Dn decreases the fraction of solvent in coating material applied to the stent since the time for evaporation of solvent from the falling droplets is increased. In addition, there is a higher evaporation rate of smaller atomized droplets due to a higher surface to volume ratio. As a result, smaller droplet size results in a lower fraction of solvent in the applied coating material. The droplet size can be controlled, for example, by nozzle design. One of skill in the art could select a nozzle that could result in smaller droplets. Additionally, reducing the flow rate of coating material will result in smaller atomized coating material droplets which can increase the evaporation rate of solvent.

To facilitate uniform and complete coverage of the stent during the application of the composition, the stent can be rotated about the stent's central longitudinal axis. Rotation of the stent can be from about 0.1 rpm to about 300 rpm, more narrowly from about 30 rpm to about 200 rpm. By way of example, the stent can rotate at about 150 rpm. The stent can also be moved in a linear direction along the same axis. The stent can be moved at about 1 mm/second to about 12 mm/second, for example about 6 mm/second, or for a minimum of at least two passes (i.e., back and forth past the spray nozzle).

In an exemplary embodiment, a stent having a substrate of PLLA is coated with PDLA. The coating material is PDLA dissolved in acetone. The weight fraction of solvent in coating material can be greater than 50%, 70%, 80%, 95%, or more narrowly, 97%. The spray nozzle temperature or atomization temperature can be between about 15° C. and 30° C. Atomization pressure can be between 5.5 psi and 7 psi. A temperature of heated air from a heat nozzle directed at the stent can be between 38° C. and 40° C. The atomization pressure of the spray gas can be between 18 psi and 22 psi. The coating material flow rate can be between 2 ml/hr and 6 ml/hr.

Drying

A stent coated with coating material can be dried by allowing the solvent to evaporate at room or ambient temperature. Depending on the volatility of the particular solvent employed, the solvent can evaporate essentially upon contact with the stent. Alternatively, the solvent can be removed by subjecting the coated stent to various drying processes. Drying time can be decreased to increase manufacturing throughput by heating the coated stent. For example, removal of the solvent can be induced by oven drying the stent at a moderate temperature (e.g., 60° C.) for a suitable duration of time (e.g., 2-4 hours) or by the application of warm air. A stent is typically dried in an oven as the final drying step when the deposition stages are completed.

Evaporation of the solvent(s) can be induced by application of a warm gas between each repetition which can prevent coating defects and minimize interaction between the active agent and the solvent. The stent may be positioned below a nozzle blowing the warm gas. A warm gas may be particularly suitable for embodiments in which the solvent employed in the coating composition is a non-volatile solvent (e.g., dimethylsulfoxide (DMSO), dimethylformamide (DMF), and dimethylacetamide (DMAC)). The temperature of the warm gas can be from about 25° C. to about 200° C., more narrowly from about 40° C. to about 90° C. By way of example, warm gas applications can be performed at a temperature of about 60° C., at a flow speed of about 5,000 feet/minute, and for about 10 seconds.

The gas can be directed onto the stent following a waiting period of about 0.1 second to about 5 seconds after the application of the coating material so as to allow the liquid sufficient time to flow and spread over the stent surface before the solvent(s) is removed to form a coating. The waiting period is particularly suitable if the coating composition contains a volatile solvent since such solvents are typically removed quickly. As used herein "volatile solvent" means a solvent that has a vapor pressure greater than 17.54 Torr at ambient temperature, and "non-volatile solvent" means a solvent that has a vapor pressure less than or equal to 17.54 Torr at ambient temperature.

Any suitable gas can be employed, examples of which include air, argon, or nitrogen. The flow rate of the warm gas can be from about 20 cubic feet/minute (CFM) (0.57 cubic meters/minute (CMM)) to about 80 CFM (2.27 CMM), more narrowly about 30 CFM (0.85 CMM) to about 40 CFM (1.13 CMM). The warm gas can be applied for about 3 seconds to about 60 seconds, more narrowly for about 10 seconds to about 20 seconds. By way of example, warm gas applications can be performed at a temperature of about 50° C., at a flow rate of about 40 CFM, and for about 10 seconds.

Regardless of the method used for drying a stent, in certain embodiments, it is important for the drying process to be performed in a consistent manner for each layer and each stent. The same or similar processing conditions or parameters may exist for each layer of coating material applied for each stent. A reason for this is that drying process parameters can influence the molecular structure and morphology of a dried polymer and drug coating. Drug release parameters depend upon on molecular structure and morphology of a coating. Therefore, drug release parameters may depend upon parameters of the drying process.

Since the temperature of a drying process is directly related to the rate of drying, in certain embodiments, it is important to control the drying temperature to obtain coating consistency. In general, the more consistent the temperature during the drying process from layer to layer and stent to stent, the more consistent the resultant coating in a given stent and from stent to stent.

Weighing of Stents

The amount of coating material applied to a stent is typically determined by comparing the weight of an uncoated and coated stent. The weight of a coated stent can be taken to be the dry coating weight. Stents are typically weighed using a microbalance, for example, the UMX5 Microbalance from Mettler-Toledo, Inc. of Columbus, Ohio. A sample to be weighed, such as a stent, is disposed on a weighing pan of coupled to a balance for weighing.

Stent and Coating Materials

A non-polymer substrate for a coating of an implantable medical device may be made of a metallic material or an alloy such as, but not limited to, cobalt chromium alloy (EL-GILOY), stainless steel (316L), high nitrogen stainless steel, e.g., BIODUR 108, cobalt chrome alloy L-605, "MP35N," "MP20N," ELASTINITE (Nitinol), tantalum, nickel-titanium alloy, platinum-iridium alloy, gold, magnesium, or combinations thereof. "MP35N" and "MP20N" are trade names for alloys of cobalt, nickel, chromium and molybdenum available from Standard Press Steel Co., Jenkintown, Pa. "MP35N" consists of 35% cobalt, 35% nickel, 20% chromium, and 10% molybdenum. "MP20N" consists of 50% cobalt, 20% nickel, 20% chromium, and 10% molybdenum.

In accordance with one embodiment, the coating material can include a solvent and a polymer dissolved in the solvent and optionally a wetting fluid. The coating material can also include active agents, radiopaque elements, or radioactive isotopes. Representative examples of polymers that may be used as a substrate of a stent or coating for a stent, or more generally, implantable medical devices include, but are not limited to, poly(N-acetylglucosamine) (Chitin), Chitosan, poly(3-hydroxyvalerate), poly(lactide-co-glycolide), poly(3-hydroxybutyrate), poly(4-hydroxybutyrate), poly(3-hydroxybutyrate-co-3-hydroxyvalerate), polyorthoester, polyanhydride, poly(glycolic acid), poly(glycolide), poly(L-lactic acid), poly(L-lactide), poly(D,L-lactic acid), poly(D,L-lactide), poly(L-lactide-co-D,L-lactide), poly(caprolactone), poly(L-lactide-co-caprolactone), poly(D,L-lactide-co-caprolactone), poly(glycolide-co-caprolactone), poly(trimethylene carbonate), polyester amide, poly(glycolic acid-co-trimethylene carbonate), co-poly(ether-esters) (e.g. PEO/PLA), polyphosphazenes, biomolecules (such as fibrin, fibrinogen, cellulose, starch, collagen and hyaluronic acid), polyurethanes, silicones, polyesters, polyolefins, polyisobutylene and ethylene-alphaolefin copolymers, acrylic polymers and copolymers, vinyl halide polymers and copolymers (such as polyvinyl chloride), polyvinyl ethers (such as polyvinyl methyl ether), polyvinylidene halides (such as polyvinylidene chloride), polyacrylonitrile, polyvinyl ketones, polyvinyl aromatics (such as polystyrene), polyvinyl esters (such as polyvinyl acetate), acrylonitrile-styrene copolymers, ABS resins, polyamides (such as Nylon 66 and polycaprolactam), polycarbonates, polyoxymethylenes, polyimides, polyethers, polyurethanes, rayon, rayon-triacetate, cellulose acetate, cellulose butyrate, cellulose acetate butyrate, cellophane, cellulose nitrate, cellulose propionate, cellulose ethers, and carboxymethyl cellulose. Additional representative examples of polymers that may be especially well suited for use in fabricating embodiments of implantable medical devices disclosed herein include ethylene vinyl alcohol copolymer (commonly known by the generic name EVOH or by the trade name EVAL), poly(butyl methacrylate), poly(vinylidene fluoride-co-hexafluoropropene) (e.g., SOLEF 21508, available from Solvay Solexis PVDF, Thorofare, N.J.), polyvinylidene fluoride (otherwise known as KYNAR, available from ATOFINA Chemicals, Philadelphia, Pa.), ethylene-vinyl acetate copolymers, poly(vinyl acetate), styrene-isobutylene-styrene triblock copolymers, and polyethylene glycol.

Examples of solvents include, but are not limited to, dimethylsulfoxide (DMSO), chloroform, acetone, water (buffered saline), xylene, methanol, ethanol, 1-propanol, tetrahydrofuran, 1-butanone, dimethylformamide, dimethylacetamide, cyclohexanone, ethyl acetate, methylethylketone, propylene glycol monomethylether, isopropanol, isopropanol admixed with water, N-methylpyrrolidinone, toluene, and combinations thereof.

A "wetting" of a fluid is measured by the fluid's capillary permeation. Capillary permeation is the movement of a fluid on a solid substrate driven by interfacial energetics. Capillary permeation is quantified by a contact angle, defined as an angle at the tangent of a droplet in a fluid phase that has taken an equilibrium shape on a solid surface. A low contact angle means a higher wetting liquid. A suitably high capillary permeation corresponds to a contact angle less than about 90°. Representative examples of the wetting fluid include, but are not limited to, tetrahydrofuran (THF), dimethylformamide (DMF), 1-butanol, n-butyl acetate, dimethylacetamide (DMAC), and mixtures and combinations thereof.

Examples of radiopaque elements include, but are not limited to, gold, tantalum, and platinum. An example of a radioactive isotope is $P^{32}$. Sufficient amounts of such substances may be dispersed in the composition such that the substances are not present in the composition as agglomerates or flocs.

Active Agents

Examples of active agents include antiproliferative substances such as actinomycin D, or derivatives and analogs thereof (manufactured by Sigma-Aldrich 1001 West Saint Paul Avenue, Milwaukee, Wis. 53233; or COSMEGEN available from Merck). Synonyms of actinomycin D include dactinomycin, actinomycin IV, actinomycin $I_1$, actinomycin $X_1$, and actinomycin $C_1$. The bioactive agent can also fall under the genus of antineoplastic, anti-inflammatory, antiplatelet, anticoagulant, antifibrin, antithrombin, antimitotic, antibiotic, antiallergic and antioxidant substances. Examples of such antineoplastics and/or antimitotics include paclitaxel, (e.g., TAXOL® by Bristol-Myers Squibb Co., Stamford, Conn.), docetaxel (e.g., Taxotere®, from Aventis S.A., Frankfurt, Germany), methotrexate, azathioprine, vincristine, vinblastine, fluorouracil, doxorubicin hydrochloride (e.g., Adriamycin® from Pharmacia & Upjohn, Peapack N.J.), and mitomycin (e.g., Mutamycin® from Bristol-Myers Squibb Co., Stamford, Conn.). Examples of such antiplatelets, anticoagulants, antifibrin, and antithrombins include aspirin, sodium heparin, low molecular weight heparins, heparinoids, hirudin, argatroban, forskolin, vapiprost, prostacyclin and prostacyclin analogues, dextran, D-phe-pro-arg-chloromethylketone (synthetic antithrombin), dipyridamole, glycoprotein IIb/IIIa platelet membrane receptor antagonist antibody, recombinant hirudin, and thrombin inhibitors such as Angiomax ä (Biogen, Inc., Cambridge, Mass.). Examples of such cytostatic or antiproliferative agents include angiopeptin, angiotensin converting enzyme inhibitors such as captopril (e.g., Capoten® and Capozide® from Bristol-Myers Squibb Co., Stamford, Conn.), cilazapril or lisinopril (e.g., Prinivil® and Prinzide® from Merck & Co., Inc., Whitehouse Station, N.J.), calcium channel blockers (such as nifedipine), colchicine, proteins, peptides, fibroblast growth factor (FGF) antagonists, fish oil (omega 3-fatty acid), histamine antagonists, lovastatin (an inhibitor of HMG-CoA reductase, a cholesterol lowering drug, brand name Mevacor® from Merck & Co., Inc., Whitehouse Station, N.J.), monoclonal antibodies (such as those specific for Platelet-Derived Growth Factor (PDGF) receptors), nitroprusside, phosphodiesterase inhibitors, prostaglandin inhibitors, suramin, serotonin blockers, steroids, thioprotease inhibitors, triazolopyrimidine (a PDGF antagonist), and nitric oxide. An example of an antiallergic agent is permirolast potassium. Other therapeutic substances or agents which may be appropriate agents include cisplatin, insulin sensitizers, receptor tyrosine kinase inhibitors, carboplatin, alpha-interferon, genetically engineered epithelial cells, steroidal anti-inflammatory agents, non-steroidal anti-inflammatory agents, antivirals, anticancer drugs, anticoagulant agents, free radical scavengers, estradiol, antibiotics, nitric oxide donors, super oxide dismutases, super oxide dismutases mimics, 4-amino-2,2,6,6-tetramethylpiperidine-1-oxyl (4-amino-TEMPO), tacrolimus, dexamethasone, ABT-578, clobetasol, cytostatic agents, prodrugs thereof, co-drugs thereof, and a combination thereof. Other therapeutic substances or agents may include rapamycin and structural derivatives or functional analogs thereof, such as 40-O-(2-hydroxy)ethyl-rapamycin (known by the trade name of EVEROLIMUS), 40-O-(3-hydroxy)propyl-rapamycin, 40-O-[2-(2-hydroxy)ethoxy]ethyl-rapamycin, methyl rapamycin, and 40-O-tetrazole-rapamycin.

Examples

The following parameters are utilized when calibrating a stent spraying machine and producing coated stents according to the present invention.

18 mm Stent
Target coating weight post baking 335 micrograms (301-368 range)
Target coating weight before oven drying: 358 micrograms (332-394)
Weight per layer 27.5 micrograms (25.5-30.3)
Number of passes 13
12 mm Stent
Target coating weight post baking 214 micrograms (193-235 range)
Target coating weight before oven drying 229 micrograms (206-252)
Weight per layer 17.6 micrograms (15.8-19.4)
Number of passes 13

For a 12 mm stent, the spraying machine was adjusted to apply 17.6 micrograms per pass of coating materials after drying. Two passes of coating materials were applied, and then the stent was moved to a drying nozzle where 40° C. air dries the stent for 15 seconds. This was repeated every 2 passes until the 13$^{th}$ pass where only one pass was made before moving to the drying nozzle. Before oven drying, but after drying the coatings, the coated stent was weighed and the coating weight per pass was calculated. The tolerance range of the weights was about plus or minus 10%. If the coating weight of the dried stent was between about 206 and about 252 micrograms, then the spray machine may be adequately calibrated. Next, the stent was baked at 50° C. for 30-60 minutes. If the coating weight of the oven dried stent was between about 193 and about 235 micrograms, then the spray machine was adequately calibrated. If the weight was more or less than that range, then the weight per layer was not correct, requiring the adjustment of a spray parameter, the coating material flow rate (pump rate), to try to achieve about 17.6 micrograms per pass of coating material. An uncoated stent was then sprayed with the coating materials with 13 passes as above, dried, and reweighed. The weight of coating material per pass was calculated. If the weight of coating material per pass is within the tolerance range of about 15.8 to about 19.4 micrograms, then the calibration of the spray machine is completed. If the weight of coating material per pass is outside the targeted range, the spraying, drying, and weighing procedure is repeated until a consistent weight per pass is achieved within the range of about 15.8 to about 19.4 micrograms for at least three consecutive stents. Then, each stent of a batch of stents was individually sprayed with 13 passes of coating material, and dried.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

What is claimed is:

1. A method of coating a stent, the method comprising:
   a) spraying a coating material from a spray device to a stent to form more than one coating layer on the stent in which a first coating layer is dried before forming a subsequent coating layer, the spraying performed according to a plurality of spraying parameters;
   b) determining an average mass per coating layer that is a result of the spraying;
   c) determining whether the average mass per coating layer is within a tolerance range around a target mass per coating layer, wherein, at least once it is determined that the average mass per coating layer is not within the tolerance range, then modifying at least one of the spraying parameters based on the average mass per coating layer that was determined to be not within the tolerance range, the at least one of the spraying parameters that is modified includes any one or combination of axial translation speed of the stent or the spray device during spraying, rotation of the stent relative to the spray device during spraying, or height of the spray device from the stent during spraying.

2. The method of claim 1, wherein the spraying of the coating material forms at least three coating layers on the stent, and the average mass per coating layer is determined from the at least three coating layers, wherein the first coating layer is dried before forming a second coating layer, and the second coating layer is dried before forming a third layer.

3. The method of claim 1, wherein the coating material comprises a polymer and a solvent.

4. The method of claim 1, wherein, before the determining of the average mass per coating layer, all of the coating layers are dried.

5. The method of claim 1, wherein the at least one spraying parameter that is modified further includes any one or combination of the flow rate of coating material, atomization pressure, the size of the atomized drops, the temperature of the atomized coating material between spray device and the stent, and the pressure of the atomized coating between the spray device and the stent.

6. The method of claim 1, wherein the tolerance range is plus or minus 10%.

7. A method of coating a batch of stents, comprising:
   a) calibrating a spraying device to obtain spraying parameters that will provide a target mass per coating layer on a stent when a coating material is sprayed on the stent, the calibrating including
      a1) spraying the coating material from the spray device to a stent to form more than one coating layer on the stent in which a first coating layer is dried before forming a subsequent coating layer, the spraying performed according to a plurality of spraying parameters,
      a2) determining an average mass per coating layer that is a result of the spraying,
      a3) determining whether the average mass per coating layer is within a tolerance range around a target mass per coating layer, wherein, at least once it is determined that the average mass per coating layer is not within the tolerance range, then modifying at least one of the spraying parameters based on the average mass per coating layer that was determined to be not within the tolerance range, the at least one of the spraying parameters that is modified includes any one or combination of axial translation speed of the stent or the spray device during spraying, rotation of the stent relative to the spray device during spraying, or height of the spray device from the stent during spraying, and
      a4) repeating steps a1-a3 on the same stent or another stent until the average mass per coating layer is within the tolerance range;
   the calibrating followed by
   b) spraying the coating material on a stent from the batch of stents, the spraying performed according to the obtained plurality of spraying parameters including one or more modifications from step a3;
   c) drying the coating material that was sprayed on the stent to form a coating layer on the sent;
   d) repeating steps b and c until a desired total number of coating layers have been applied on the stent; and e) performing steps b-d for each additional stent in the batch of stents.

8. The method of claim 7, further comprising oven drying the coated stent after step d.

9. The method of claim 7, wherein the coating material comprises a polymer and a solvent.

10. The method of claim 7, wherein in step a4, steps a1-a3 are repeated until the average mass per coating layer is within the tolerance range around the target mass per coating layer for three consecutive stents before continuing to b.

11. The method of claim 7, wherein the spraying of the coating material in step a1 forms at least three coating layers, and the average mass per coating layer is determined from the at least three coating layers.

12. The method of claim 7, wherein the at least one spraying parameter that is modified further includes any one or combination of the flow rate of coating material, atomization pressure, the size of the atomized drops, the temperature of the atomized coating material between the spray device and the stent, and the pressure of the atomized coating between the spray device and the stent.

13. The method of claim 7, wherein the tolerance range is plus or minus 10%.

14. The method of claim 1, further comprising repeating steps a-c on the same stent or another stent until the average mass per coating layer is within the tolerance range, wherein steps a-c are repeated at least once.

15. The method of claim 1, after the modifying of the at least one of the spraying parameters based on the average mass per coating layer, then spraying the coating material on a batch of stents according to the least one of the spraying parameters that was modified.

16. The method of claim 14, wherein all of the coating layers are dried after each spraying step of the coating material on the stent.

17. The method of claim 16, wherein the spraying step comprises more than one pass of the stent past the spray device.

* * * * *